(12) United States Patent
Jung

(10) Patent No.: US 9,970,362 B2
(45) Date of Patent: May 15, 2018

(54) CONTROLLING AN INTERNAL COMBUSTION ENGINE WITH ADJUSTABLE CAMSHAFT

(71) Applicant: GM GLOBAL TECHNOLOGY OPERATIONS LLC, Detroit, MI (US)

(72) Inventor: Dirk Jung, Ruesselsheim (DE)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days. days.

(21) Appl. No.: 15/443,280

(22) Filed: Feb. 27, 2017

(65) Prior Publication Data
US 2017/0248084 A1    Aug. 31, 2017

(30) Foreign Application Priority Data
Feb. 26, 2016  (DE) .................. 10 2016 002 361

(51) Int. Cl.
*F02D 13/02*    (2006.01)
*F02D 41/00*    (2006.01)
(Continued)

(52) U.S. Cl.
CPC .......... *F02D 13/0215* (2013.01); *F01L 1/047* (2013.01); *F01L 1/344* (2013.01); *F02D 41/009* (2013.01); *F02D 41/062* (2013.01); *F02D 41/26* (2013.01); *F01L 1/053* (2013.01); *F01L 1/185* (2013.01); *F01L 2105/00* (2013.01);
(Continued)

(58) Field of Classification Search
CPC ...... F02D 13/02; F02D 13/0215; F02D 41/00; F02D 41/009; F02D 41/41062; F02D 41/26; F02D 2041/001; F01L 1/047; F01L 1/344; F01L 1/053; F01L 1/185; F01L 2800/09; Y02T 10/18
See application file for complete search history.

(56) References Cited

U.S. PATENT DOCUMENTS

| 5,417,187 A * | 5/1995 | Meyer ..................... | F01L 1/34 123/90.15 |
|---|---|---|---|
| 6,691,024 B2 * | 2/2004 | Kunz ..................... | F01L 1/34 123/90.15 |

(Continued)

FOREIGN PATENT DOCUMENTS

| DE | 4307010 C2 | 10/1993 |
|---|---|---|
| DE | 19958174 C1 | 10/2000 |

(Continued)

OTHER PUBLICATIONS

German Patent Office, German Search Report for German Application No. 102016002361.9, dated Feb. 26, 2016.

*Primary Examiner* — Hieu T Vo
(74) *Attorney, Agent, or Firm* — Lorenz & Kopf LLP

(57) ABSTRACT

A method is disclosed for controlling an internal combustion engine having a first adjustable camshaft for the actuating of first valve elements of the internal combustion engine. An effect of an actuation at least of a first valve element by the first camshaft on this valve element is detected. An actual position of the first camshaft and/or of a crankshaft driving the latter is detected on the basis of this detecting of the effect. An adjustment of the first camshaft is calibrated on the basis of a first deviation between this detected actual position and a predetermined required position.

18 Claims, 2 Drawing Sheets

(51) Int. Cl.
    *F01L 1/047*           (2006.01)
    *F01L 1/344*           (2006.01)
    *F02D 41/06*           (2006.01)
    *F02D 41/26*           (2006.01)
    *F01L 1/053*           (2006.01)
    *F01L 1/18*            (2006.01)

(52) U.S. Cl.
    CPC ..... *F01L 2800/09* (2013.01); *F01L 2820/041* (2013.01); *F01L 2820/043* (2013.01); *F02D 2041/001* (2013.01); *Y02T 10/18* (2013.01)

(56) References Cited

U.S. PATENT DOCUMENTS

| | | |
|---|---|---|
| 7,783,414 B2 | 8/2010 | Carrado, Jr. |
| 8,180,552 B2 | 5/2012 | Nomura et al. |
| 8,918,269 B2 | 12/2014 | Irie et al. |
| 2013/0125844 A1 | 5/2013 | Su et al. |
| 2015/0285177 A1 | 10/2015 | Nakamura et al. |

FOREIGN PATENT DOCUMENTS

| | | |
|---|---|---|
| DE | 10039921 A1 | 4/2001 |
| DE | 10335072 A1 | 3/2004 |
| DE | 60301451 T2 | 2/2006 |

\* cited by examiner

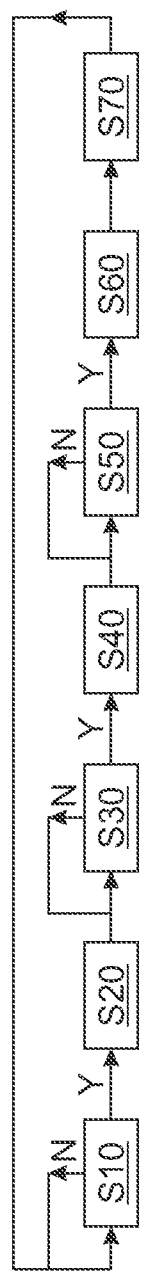

CONTROLLING AN INTERNAL COMBUSTION ENGINE WITH ADJUSTABLE CAMSHAFT

CROSS-REFERENCE TO RELATED APPLICATION

This application claims priority to German Patent Application No. 102016002361.9, filed Feb. 26, 2016, which is incorporated herein by reference in its entirety.

TECHNICAL FIELD

The present disclosure pertains to a method and a control for controlling an internal combustion engine, which has at least one adjustable camshaft, and a motor vehicle with the control, and a computer program product for carrying out the method.

BACKGROUND

From U.S. Pat. No. 8,180,552 B2 a method is known for controlling variable element times in which, based on a crank angle signal and a cam angle signal, a phase shift is determined between a crankshaft and a camshaft.

SUMMARY

According to the present disclosure an improved control of an internal combustion engine is provided. According to an embodiment of the present disclosure, an internal combustion engine for a motor vehicle has at least one adjustable camshaft for actuating valve elements of the internal combustion engine. The internal combustion engine may be an Otto or diesel engine, in particular with or without an (exhaust-gas) turbocharger.

In an embodiment, the valve elements are valve actuator elements, in particular valve tappets or suchlike for the opening and closing of inlet valves or outlet valves of the internal combustion engine or respectively inlet or outlet valve actuator elements, the camshaft accordingly in particular an inlet or outlet camshaft.

According to an embodiment of the present disclosure, a method for automated control of the internal combustion engine detects an effect of an actuation at least of a first valve element by the first camshaft on this valve element or respectively detects an effect which an actuation of the valve element by the camshaft exerts on this valve element; detecting of an actual position of the first camshaft and/or of a crankshaft driving the latter or respectively coupled to the latter on the basis of or respectively as a function of this detecting of the effect; and calibrating an adjustment of the first camshaft on the basis of a deviation between this detected actual position and a predetermined required position, in particular of the first camshaft and/or crankshaft, which is designated below without loss of generality as a first deviation.

In an embodiment, an adjustment of a camshaft (camshaft adjustment) includes a variable and/or targeted or respectively predetermined, in particular control-technology, mechanical, hydraulic, pneumatic and/or electric, in particular electromagnetic, alteration of a coupling or respectively phase shift between the camshaft and a crankshaft of the internal combustion engine through or respectively by a mechanical, hydraulic, pneumatic and/or electric, in particular electromagnetic, camshaft adjustment device and/or on the basis of or respectively as a function of an operating state of the internal combustion engine and/or of the motor vehicle, in particular a rotation speed and/or load, in particular throttle valve position, of the internal combustion engine. In addition, reference is made in this respect to U.S. Pat. No. 8,180,552 B2 and its content is included entirely into the present disclosure.

In an embodiment, control, in particular opening or respectively closing times of the valves or respectively valve elements can be altered in a targeted manner through a camshaft adjustment, and hereby in a further development a performance, torque, fuel consumption and/or exhaust gas emission of the internal combustion engine can be improved.

If, however, (only) one position of the crankshaft and if applicable (also) of the camshaft relative to the crankshaft is known, actual control, in particular opening or respectively closing times or respectively points of the valves or respectively valve elements, can vary owing to manufacturing and/or assembly tolerances between internal combustion engines of the same type and/or changes, due to wear for example, and/or can deviate from intended values or respectively values assumed in the design of the camshaft adjustment.

In particular, it can then occur that a valve (element) does not yet open or close in a predetermined crankshaft position or respectively predetermined (through the camshaft adjustment) camshaft position, although this is intended or respectively assumed in the predetermined position, or that, vice versa, a valve (element) is already opened or respectively closed in a predetermined crankshaft position or respectively predetermined (through the camshaft adjustment) camshaft position, although this is not intended or respectively assumed in the predetermined position.

In an embodiment, by an actual position of a camshaft and/or of a crankshaft driving the latter being detected on the basis of or respectively as a function of a detecting of an (actual or respectively carried out) effect of an actuation of at least one valve element by this camshaft on this valve element, being compared with a predetermined required position (for this effect) of this camshaft or respectively crankshaft and an adjustment of this camshaft being calibrated on the basis of a deviation which is determined here, in an embodiment the control of the internal combustion engine, in particular the adjustment of the camshaft, can be improved, in particular its precision can be increased.

Hereby, in a further development an adjustment range of the camshaft can be better utilized, in particular compared to embodiments hitherto, in which hitherto owing to the variations described above, greater distances to thermally caused limits are maintained. Thereby, in a further development a performance, torque, fuel consumption and/or exhaust gas emission of the internal combustion engine can be improved.

In an embodiment, the internal combustion engine has at least one further adjustable camshaft for the actuating of further valve elements of the internal combustion engine, which are designated below, without loss of generality, as second adjustable camshaft or respectively second valve elements.

In an embodiment, the second valve elements are valve (actuation) elements, in particular valve tappets or suchlike, for the opening and closing of outlet or inlet valves of the internal combustion engine or respectively outlet or inlet valve (actuation) elements, the second camshaft accordingly in particular an outlet or inlet camshaft.

In an embodiment, the method explained here can also be carried out in the same manner for this/these further or respectively second camshaft(s) and accordingly include: detecting of an effect of an actuation at least of a second valve element of the internal combustion engine by a second camshaft of the internal combustion engine on this valve element; detecting of an actual position of the second camshaft and/or of a crankshaft driving the latter or respectively coupled to the latter on the basis of or respectively as a function of this detecting of the effect; and calibrating of an adjustment of the second camshaft on the basis of a deviation between this detected actual position and a predetermined required position, in particular of the second camshaft and/or crankshaft, which is designated below without loss of generality also as a first deviation. Thereby, in an embodiment, a performance, torque, fuel consumption and/or exhaust gas emission of the internal combustion engine can be further improved.

According to an embodiment, the method additionally includes: detecting of an effect of an actuation of one or more further valve elements of the internal combustion engine by the same camshaft, in particular therefore of further first valve elements by the first camshaft and/or of further second valve elements by the second camshaft, on this/these further valve element(s); respectively detecting of a further actual position of this camshaft and/or of the crankshaft driving the latter on the basis of this detecting of the effect of this/these further valve element(s); and calibrating of the adjustment of this camshaft on the basis of the first deviation and of one or more second deviations respectively between the or respectively one of the detected further actual position(s) of the predetermined actual position(s), in particular of the camshafts and/or crankshaft.

Additionally or alternatively, in an embodiment the method includes: detecting of an effect of one or more further actuations of the same valve element of the internal combustion engine by the camshaft, in particular therefore of further actuations of a or respectively of the first valve element by the first camshaft and/or further actuations of a or respectively of the second valve element by the second camshaft, on this valve element; respectively detecting of a further actual position of the camshafts and/or of the crankshaft driving the latter on the basis of this detecting of the effect of the further actuation; and calibrating of the adjustment of the camshaft on the basis of the first deviation and of one or more second deviations respectively between the or one of the detected further actual position(s) and the predetermined required position(s), in particular of the camshafts and/or crankshaft.

Hereby, in an embodiment, the calibration, in particular its precision and/or reliability, can be improved. In particular, in an embodiment, deviations due in particular to tolerance or measurement technology, between different valve elements (actuations) of the same camshaft and/or different cycles or respectively camshaft revolutions can thus be at least partially compensated.

In particular, for this, in an embodiment, the adjustment of the (first and/or second) camshaft is calibrated respectively on the basis of a mean, in particular average value of the first and second deviation(s).

In an embodiment, the effect of the actuation of a valve element can include, in particular be, a start and/or end of an opening process and/or of a closing process of this valve element or respectively of a valve by this valve element. In particular, in an embodiment, a start and/or an end of one or several opening and/or closing processes of one or more valves or respectively valve elements by the first and/or one or more second camshafts are detected, one or more actual positions of this/these camshaft(s) or respectively crankshaft driving the latter are detected on the basis of or respectively as a function of this detecting, and the adjustment of the camshaft(s) is calibrated on the basis of or respectively as a function of deviations between these actual positions and required positions predetermined in particular for a start and/or end of an opening process and/or of a closing process.

In an embodiment, a start and/or end of an opening process and/or of a closing process of one or more valve elements can be detected in particularly precise manner and/or can have a significant influence on an influencing of the internal combustion engine by the adjustment of its camshaft(s) actuating or respectively controlling this valve element. In particular, therefore, through the detecting of a start and/or end of at least one opening and/or closing process, in an embodiment, a performance, torque, fuel consumption and/or exhaust gas emission of the internal combustion engine can be improved.

In an embodiment, a predetermined required position of a camshaft or respectively crankshaft, to which a deviation of a detected actual position of this camshaft or respectively crankshaft is determined or respectively by which an actual position of this camshaft or respectively crankshaft, detected on the basis of a detection of an effect, is compared, is respectively a position of this camshaft or respectively crankshaft, in which the detected effect, in particular with design of a camshaft adjustment characteristic map and/or of a camshaft adjustment device, is provided or respectively predetermined or respectively assumed or respectively desired, in particular therefore a required position at or respectively for a required start or respectively required end of an opening or respectively closing process of the corresponding valve element. In an embodiment, an actual position is detected on the basis of or as a function of a detecting of an effect, by it being detected as a result of or respectively on detecting of the effect, in particular therefore at a or respectively on the basis of a detected start or respectively end of an opening or respectively closing process of the corresponding valve element.

In an embodiment, an effect of one or more actuations of one or more valve elements by one or more camshafts on the respective valve element is detected respectively by detecting of a force acting on this valve element or a coupling arrangement between the valve element and the camshaft and/or of an adjustment travel of the valve element or of a coupling arrangement between the valve element and the camshaft.

In an embodiment, through the detecting of an adjustment travel, an effect, in particular a start and/or end of an opening and/or closing process, can be detected in a particularly precise manner. In an embodiment, through the detecting of a force, an effect, in particular a start and/or end of an opening and/or closing process, can be detected at an early stage and/or in an advantageous manner with regard to measurement technology, in particular in a compact manner. Through the detecting of a force acting on the valve element itself or respectively directly, or of an adjustment travel of the valve element itself, in an embodiment, an effect, in particular a start and/or end of an opening and/or closing process, can be detected directly and therefore in particular in a precise manner. Through the detecting of a force acting on a coupling arrangement or of an adjustment travel of the coupling arrangement, in an embodiment, an effect, in particular a start and/or end of an opening and/or closing process, can be detected at an early stage and/or in an advantageous manner with regard to measurement technology, in particular in a compact manner.

In an embodiment, the coupling arrangement is a mechanical coupling arrangement, it can have in particular a bucket tappet, a cam follower or rocker lever, in particular a roller cam follower or roller rocker arm, and/or can have a hydraulic, valve element clearance compensation. Accordingly, in an embodiment, a force acting on a bucket tappet, on a cam follower or rocker lever, in particular roller cam follower or roller rocker arm, and/or on an, in particular hydraulic, valve element clearance compensation or an adjustment travel of a bucket tappet, cam follower or rocker lever, roller cam follower or roller rocker arm and/or of a spring plate hereof, and/or of a hydraulic, valve element clearance compensation, is detected.

In an embodiment, an effect of one or more actuations of one or more valve elements by one or more camshafts on the respective valve element is detected respectively electrically, capacitively, piezoelectrically and/or electromagnetically, or by at least one Hall sensor. Hereby, in an embodiment, the effect can be detected in a particularly precise and/or compact manner.

In an embodiment, an effect of one or more actuations of one or more valve elements by one or more camshafts on the respective valve element is detected respectively on a predetermined reference adjustment of the camshaft, in particular of a camshaft adjustment device, in particular, in an embodiment, the camshaft, in particular the camshaft adjustment device, is adjusted for calibration into this predetermined reference adjustment. Hereby, in an embodiment, an adjustment, in particular a camshaft adjustment characteristic map, which is based on the predetermined reference adjustment of the camshaft or respectively originates therefrom, or respectively the camshaft adjustment device, can be advantageously calibrated.

In a further development, this reference adjustment is an initial or respectively zero and/or locking adjustment, in which a or respectively the camshaft adjustment device is able to be locked, in particular is or respectively is being locked.

In an embodiment, a position, in particular a detected actual position or respectively a required position, of a camshaft includes, in particular is, an actual or respectively required position of the camshaft relative to a position of a crankshaft of the internal combustion engine, for example a position of a top dead center of a first cylinder ("TDC 1st cylinder"), therefore an actual or respectively required phase shift of the camshaft with respect to the crankshaft. A position can therefore generally be in particular an angular position or respectively a torsion rotation angle.

Hereby, in an embodiment, an adjustment, in particular a camshaft adjustment characteristic map, or respectively a camshaft adjustment device, can be calibrated in an advantageous, in particular simple and/or precise manner.

In an embodiment, the calibrating of an adjustment of a camshaft includes a modification, in particular displacement, of predetermined camshaft required positions, in particular of a or respectively the camshaft adjustment characteristic map, in a further development proportionally to the determined deviation or respectively the determined deviations or respectively the mean value thereof and/or by an offset, in particular by the determined deviation(s) or respectively the mean value thereof.

When, for example, one or more of the detected actual positions of a camshaft deviate from the required positions of the camshaft corresponding thereto (on average) by a particular difference, this camshaft opens or respectively closes the valve elements, which are actuated by it, too early or respectively too late. In an embodiment, the required positions, predetermined in particular in the form of a camshaft adjustment characteristic map, can be corrected by this difference, in particular shifted by a corresponding offset, and the adjustment of the camshaft can thus be (re)calibrated. In an embodiment, a zero or respectively reference value of the camshaft adjustment characteristic map can be shifted by the offset, in order to modify the camshaft adjustment characteristic map or respectively the predetermined required positions.

Additionally or alternatively, in an embodiment, the calibrating of an adjustment of a camshaft includes a calibrating, in particular an adjustment, in particular turning, of a or respectively the camshaft adjustment device for the adjusting of the camshaft, in particular a reference, in particular initial or respectively zero position of the camshaft adjustment device, in a further development proportionally to the determined deviation or respectively the determined deviations or respectively the mean value thereof and/or by an offset, in particular by the determined deviation(s) or respectively the mean value thereof.

Hereby, in an embodiment, an adjustment, in particular a camshaft adjustment characteristic map or respectively a camshaft adjustment device, can be calibrated in an advantageous, in particular simple and/or precise manner.

In an embodiment, a camshaft adjustment characteristic map can be provided, in particular stored, in table form or also as a function or respectively relation.

In an embodiment, the internal combustion engine is designed or respectively arranged in such a way that the camshaft required positions, in particular a camshaft adjustment characteristic map, and/or a or respectively the camshaft adjustment device, in particular of a reference, in particular initial or respectively zero position of the camshaft adjustment device, are able to be altered for calibrating of the adjustment of the camshaft by at least 1°, in particular at least 2°, and/or at most 10°, in particular at most 6°, crankshaft angle, in particular therefore additionally to a characteristic map or respectively adjustment range for the adjustment of the camshaft during operation or respectively for the altering of control times of the valve elements.

Hereby, in an embodiment, an adjustment of a camshaft can be advantageously calibrated and/or an, in particular structurally to be maintained, adjustment range can be advantageously delimited.

In an embodiment, a method, described here, is carried out in one or more predetermined operating states of the internal combustion engine, in particular in one or more start phases, in particular each start phase or respectively after a predetermined number of start phases, of the internal combustion engine, and/or in one or more predetermined operating points of the internal combustion engine, in particular on reaching the predetermined operating point or one of several predetermined operating points, in particular each reaching or respectively after a predetermined number of reachings.

Hereby, in an embodiment, a calibration can be advantageously updated and thus a performance, torque, fuel consumption and/or exhaust gas emission of the internal combustion engine can be further improved.

According to an embodiment of the present disclosure, a control for the controlling of the internal combustion engine, in particular by hardware and/or software, in particular by programming, is arranged for carrying out a method described herein. The control is configured to detect an effect of an actuation at least of a first valve element by the first camshaft on this valve element; detect an actual position of the first camshaft and/or of a crankshaft driving the latter on the basis of this detecting of the effect; and calibrate an adjustment of the first camshaft on the basis of a first deviation between this detected actual position and a predetermined required position, in particular of the first camshaft and/or of the crankshaft.

In an embodiment, the control is further configured to detect an effect of an actuation at least of a second valve element of the internal combustion engine by a second camshaft of the internal combustion engine on this valve element; detect an actual position of the second camshaft and/or of a crankshaft driving the latter on the basis of this detecting of the effect; and calibrate an adjustment of the second camshaft on the basis of a first deviation between this detected actual position and a predetermined required position, in particular of the second camshaft and/or of the crankshaft.

Additionally or alternatively, in an embodiment the control is also configured to detect an effect of an actuation at least of a further valve element of the internal combustion engine by the same camshaft on this further valve element; detect a further actual position of this camshaft and/or of the crankshaft driving the latter on the basis of this detecting of the effect on the further valve element; and calibrate the adjustment of this camshaft on the basis of the first deviation and of a second deviation between the detected further actual position and a predetermined required position, in particular of the camshaft and/or of the crankshaft.

Additionally or alternatively, in an embodiment the control is configured to detect an effect at least of a further actuation of the same valve element of the internal combustion engine by the camshaft on this valve element; detect a further actual position of the camshaft and/or of the crankshaft driving the latter on the basis of this detecting of the effect of the further actuation; and calibrate the adjustment of the camshaft on the basis of the first deviation and of a second deviation between the detected further actual position and of a predetermined required position, in particular of the camshaft and/or of the crankshaft.

Additionally or alternatively, in an embodiment, the control is configured to calibrate the adjustment of the camshaft on the basis of a mean value of the deviations.

Additionally or alternatively, in an embodiment, the control is configured to detect at least an effect of an actuation of a valve element by a camshaft on this valve element by detecting a force acting on the valve element or a coupling arrangement between the valve element and the camshaft and/or of an adjustment travel of the valve element or of a coupling arrangement between the valve element and the camshaft.

Additionally or alternatively, in an embodiment, the control is configured to electrically, capacitively, piezoelectrically and/or electromagnetically detect at least of one effect of an actuation of a valve element by a camshaft on this valve element, in particular by at least one Hall sensor.

Additionally or alternatively, in an embodiment the control is configured to detect at least one effect of an actuation of a valve element by a camshaft on this valve element with a predetermined reference adjustment of the camshaft, in particular for adjusting the camshaft, in particular of the camshaft adjustment device, for calibration into this predetermined reference adjustment.

Additionally or alternatively, in an embodiment the control is configured to detect a position of a camshaft relative to a position of a crankshaft of the internal combustion engine and modify predetermined camshaft required positions, in particular of a camshaft adjustment characteristic map, and/or calibrate a camshaft adjustment device, in order to calibrate an adjustment of the camshaft.

Additionally or alternatively, in an embodiment the control is configured to carry out the method in at least one predetermined operating state of the internal combustion engine, in particular in at least one start phase of the internal combustion engine, in particular in each start phase or respectively after a predetermined number of start phases of the internal combustion engine, and/or in at least one predetermined operating point of the internal combustion engine, in particular on reaching at least one predetermined operating point, in particular each reaching or respectively after a predetermined number of reachings.

In the sense of the present disclosure the control can be configured by hardware and/or software, in particular can have an in particular digital processing—in particular microprocessor unit (CPU), preferably data—or respectively signal-related to a memory—and/or bus system, and/or can have one or more programs or program modules. The CPU can be configured to process instructions which are implemented as a program stored in a memory system, to detect input signals from a data bus and/or to deliver output signals to a data bus. A memory system can have one or more, in particular different, storage media, in particular optical, magnetic, solid state—and/or other non-volatile media. The program can be provided in such a way that it embodies or respectively is able to carry out the methods described here, so that the CPU can carry out the steps of such methods and therefore in particular can calibrate and/or control in particular an internal combustion engine or respectively the adjustment of its camshaft(s), in particular a camshaft adjustment device.

According to an embodiment, one or more steps of a method described here are carried out in a completely or partially automated manner, in particular by the control or respectively its means.

BRIEF DESCRIPTION OF THE DRAWINGS

The present disclosure will hereinafter be described in conjunction with the following drawing figures, wherein like numerals denote like elements.

FIG. 2 is a flowchart for controlling the internal combustion engine according to an embodiment of the present disclosure.

DETAILED DESCRIPTION

Figure 1:
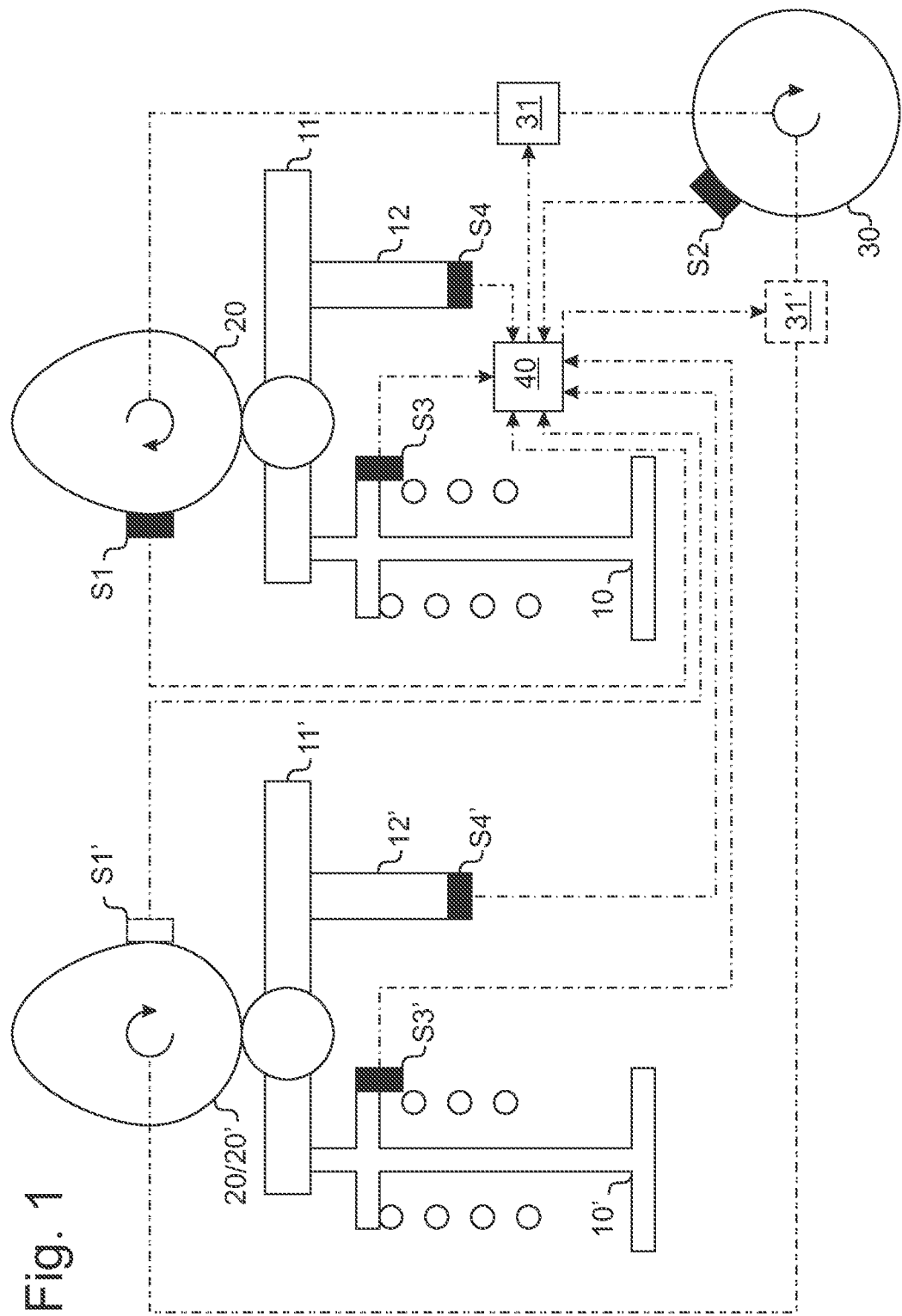
FIG. 1 shows a portion of an internal combustion engine of a motor vehicle and a control for controlling the internal combustion engine according to an embodiment of the present.

The following detailed description is merely exemplary in nature and is not intended to limit the invention or the application and uses of the invention. Furthermore, there is no intention to be bound by any theory presented in the preceding background of the invention or the following detailed description.

FIG. 1 shows a portion of an internal combustion engine of a motor vehicle and a control for controlling the internal combustion engine according to an embodiment of the present disclosure. The internal combustion engine has a first valve element 10, which is able to be actuated by a first camshaft 20 in a manner known per se via a coupling arrangement with a roller cam follower 11 and with a hydraulic valve element clearance compensation 12. The internal combustion engine has further first valve elements which are able to be actuated in an identical manner via in each case a coupling arrangement with a roller cam follower and with a hydraulic valve element clearance compensation likewise by the first camshaft 20, and second valve elements, which are able to be actuated by a second camshaft 20' in an identical manner, known per se, via in each case a coupling arrangement with a roller cam follower and with a hydraulic valve element clearance compensation. For more compact illustration, in FIG. 1 by way of example only one additional valve element 10' is shown with roller cam follower 11' and hydraulic valve element clearance compensation 12', which likewise can be such a further first valve element able to be actuated by the first camshaft 20 or such a second valve element able to be actuated by the second camshaft 20'.

The internal combustion engine has in addition a crankshaft 30, which in a manner known per se is coupled via a camshaft adjustment device 31 in a variable manner with the first camshaft 20 and a camshaft adjustment device 31' (which in FIG. 1 is illustrated in dashed lines, owing to the shared illustration of a further first and a second valve element 10') with the second camshaft 20', as indicated in FIG. 1 by a double-dot dashed coupling line.

The control includes an electronic control unit or ECU 40, which is signal-related to a sensor S1, for example a trigger wheel, for detecting a rotation angle of the first camshaft 20, a sensor S1', for example a trigger wheel, for detecting a rotation angle of the second camshaft 20' (which is illustrated in dashed lines in FIG. 1, owing to the shared illustration of a further first and a second valve element 10'), a (crankshaft) sensor S2 for detecting a position of the crankshaft 30 and optionally with sensors S3, S3' for detecting an adjustment travel of the first and further first or respectively second valve element 10, 10', or sensors S4, S4' for detecting a force, which detect forces which act on the valve element clearance compensations 12, 12'. By the sensors S1, S1' and S2, the ECU 40 detects an actual position or respectively actual phase shift of the first and second camshaft 20, 20' relative to the crankshaft 30.

The ECU 40 controls the camshaft adjustment devices 31, 31' or respectively an adjustment of the camshafts 20, 20' and carries out, for this, a method, explained below with reference to FIG. 2, according to an embodiment of the present disclosure.

At S10, the ECU 40 checks whether a start phase of the internal combustion engine is present or respectively whether the internal combustion engine has just been started. If this is not the case (S10: "N"), it waits for a next start phase of the internal combustion engine.

When a start phase of the internal combustion engine is present (S10: "Y"), at S20 the ECU 40 adjusts the camshafts 20, 20' into a reference adjustment, for example a zero- or respectively locking adjustment, in a further development it locks the camshaft adjustment device 30 during the following calibration in this position.

At S30, the ECU 40 checks whether the sensor S3 has detected a start of an opening process of the valve element 10. In a modification, the ECU 40 can also check in step S30 whether the sensor S3 has detected an end of a closing process of the valve element 10. Likewise, at S30 the ECU 40 can also check whether the sensor S4, on the basis of corresponding force values detected by the sensor S4, has detected a start of an opening process or an end of a closing process of the valve element 10.

As long as this is not the case (S30: "N"), the ECU 40 waits for such a detecting of an effect of an actuation of the valve element 10 by the camshaft 20 on the valve element 10.

With such a detection (S30: "Y") the ECU 40 detects at S40 by the sensors S1, S2 an actual position, present here, of the first camshaft 20, compares this with a predetermined required position of the first camshaft 20 for or respectively during the opening or respectively closing of the valve element 10 and determines a deviation $\alpha_1$ between actual and required position. If, for example (for the configuration of a camshaft adjustment characteristic map or of the camshaft adjustment device 31) an opening or respectively closing is provided at a particular camshaft required position $\alpha_{N,\,d}$ and if the ECU 40 detects this opening or respectively closing instead at a camshaft actual position $\alpha_{N,\,i}$, then it determines at S40 as a difference $\Delta_1 = \alpha_{N,\,d} - \alpha_{N,\,i}$. If the difference $\Delta_1$ is therefore for example greater than zero, the valve element opens or respectively closes too early or respectively at an earlier position of the crankshaft 30.

At S50, the ECU 40 checks in an analogous manner whether the sensor S3 has detected a start of a further opening process of the valve element 10. In a modification, the ECU 40 can also check again at S50 whether the sensor S3 has detected an end of a further closing process of the valve element 10. Likewise, the ECU 40 can also check at S50 whether the sensor S4, on the basis of corresponding force values detected by the sensor S4, has detected a start of a further opening process or an end of a further closing process of the valve element 10.

Likewise, at S50 the ECU can also check whether the sensor S3' has detected a start of an opening process of the further first valve element 10'. In a modification, the ECU 40 can again also check at S50 whether the sensor S3' has detected an end of a closing process of the further first valve element 10'. Likewise, at S50 the ECU can also check whether the sensor S4', on the basis of corresponding force values detected by the sensor S4', has detected a start of an opening process or an end of a closing process of the further first valve element 10'.

As long as this is not the case (S50: "N"), the ECU 40 waits for such a detection.

With such a detection (S50: "Y"), the ECU 40 detects in at S60 in an analogous manner by the sensors S1, S2 an actual position, present there, of the first camshaft 20, compares this with a predetermined required position of the first camshaft 20 on opening or respectively closing of the valve element 10 or respectively 10' and determines a second deviation $\Delta_2$ between this actual position and required position.

At S70, the ECU 40 averages the deviation $\Delta_1$, which was determined at S40 on detecting the opening or respectively closing of the first valve element 10, and the deviation $\Delta_2$, which was determined in step S60 on detecting the further opening or respectively closing of the first valve element 10 or respectively on detecting the opening or respectively closing of the further first valve element 10', to an averaged deviation $\Delta = (\Delta_1 + \Delta_2)/2$.

Then at S70 it calibrates the adjustment of the first camshaft 20 on the basis of this averaged difference $\Delta$. For this, in an embodiment, the ECU 40 shifts a camshaft adjustment characteristic map by the determined deviation $\Delta$, by shifting every camshaft required position of this characteristic map by this difference $\Delta$.

If, for example, it is established at S30-S70 that the camshaft 20 on an opening or respectively closing of the valves on average has, instead of a predetermined required position $\alpha_{N,\,d}$, an effective actual position $\alpha_{N,\,i}$, after S70, required values shifted accordingly by this offset $\Delta = \alpha_{N,\,d} - \alpha_{N,\,i}$ are provided for the camshaft adjustment device 31, so that it in fact realizes the actually desired actual value or respectively opening or respectively closing times.

The calibration of the adjustment of the camshaft 20 can be realized in particular by a corresponding shifting of a reference, in particular zero point or respectively benchmark of the camshaft adjustment characteristic map.

In another embodiment, at S70 for the calibration of the adjustment of the camshaft 20, the ECU 40 adjusts the camshaft adjustment device 31 or respectively a zero position of the camshaft adjustment device 31 by this offset Δ. When the camshaft adjustment device 31 then receives corresponding (adjustment) actuating instructions for the adjusting of the camshaft 20 (with respect to this zero position), it now adjusts control times of the valve elements 10, 10' in the intended or respectively designated manner.

For the second camshaft 20', the ECU 40 carries out in a parallel manner an analogous method, explained above with reference to FIG. 2.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for controlling an internal combustion engine having an adjustable camshaft for the actuating of a valve element of the internal combustion engine, the method comprising:
    detecting a first effect of an actuation of a first valve element by a first camshaft;
    detecting an actual position of at least one of the first camshaft and a crankshaft driving the first camshaft on the basis of the first detected effect; and
    calibrating an adjustment of the first camshaft on the basis of a first deviation between the detected actual position and a predetermined required position.

2. The method according to claim 1 further comprising:
    detecting a second effect of an actuation of a second valve element of the internal combustion engine by the first camshaft of the internal combustion engine;
    detecting an actual position of at least one of the first camshaft and the crankshaft driving the first camshaft on the basis of the second detected effect; and
    calibrating an adjustment of the first camshaft on the basis of a second deviation between the detected actual position and a predetermined required position.

3. The method according to claim 2, further comprising:
    detecting a third effect of an actuation of a third valve element of the internal combustion engine by a second camshaft of the internal combustion engine;
    detecting an actual position of at least one of the second camshaft and the crankshaft driving the second camshaft on the basis of the second detected effect; and
    calibrating an adjustment of the second camshaft on the basis of a second deviation between the detected actual position and a predetermined required position.

4. The method according to claim 2, wherein the adjustment of the first camshaft is calibrated on the basis of a mean value of the first and second deviations.

5. The method according to claim 1, further comprising:
    detecting a second effect of an actuation of a second valve element of the internal combustion engine by a second camshaft of the internal combustion engine;
    detecting an actual position of at least one of the second camshaft and the crankshaft driving the second camshaft on the basis of the second detected effect; and
    calibrating an adjustment of the second camshaft on the basis of a second deviation between the detected actual position and a predetermined required position.

6. The method according to claim 5, wherein the adjustment of the first and second camshafts is calibrated on the basis of a mean value of the first and second deviations.

7. The method according to claim 1, wherein detecting the first effect comprises detecting one of a start of an opening process, an end of the opening process, a start of a closing process or an end of the closing process for the first valve element.

8. The method according to claim 1, wherein the first detected effect is selecting from the group consisting of a force acting on the first valve element, a coupling arrangement between the first valve element and the first camshaft, an adjustment travel of the first valve element.

9. The method according to claim 1, where detecting the first effect comprises one of electrically detecting, capacitively detecting, piezoelectrically detecting or electromagnetically detecting the first effect.

10. The method according to claim 1, further comprising detecting the first effect with a predetermined reference adjustment of the camshaft.

11. The method according to claim 1, wherein a position of the first camshaft comprises a position of the first camshaft relative to a position of the crankshaft of the internal combustion engine.

12. The method according to claim 11, wherein calibrating an adjustment of the first camshaft comprises modifying a predetermined camshaft required position.

13. The method according to claim 12, wherein the predetermined camshaft required position comprising a camshaft adjustment characteristic map.

14. The method according to claim 12, further comprising altering the camshaft required position by at least 1° and not more than 10° crankshaft angle.

15. The method according to claim 11, wherein calibrating an adjustment of the first camshaft comprises calibrating a camshaft adjustment device.

16. The method according to claim 15, further comprising altering the camshaft adjustment device by at least 1° and not more than 10° crankshaft angle.

17. The method according to claim 1, wherein the method is carried out during a start phase and at one predetermined operating point of the internal combustion engine.

18. A non-transitory computer readable medium comprising a program code having computer instructions, which when executed on a computer, is configured to carry out the method according to claim 1.

* * * * *